US007913166B2

(12) United States Patent
Clark et al.

(10) Patent No.: US 7,913,166 B2
(45) Date of Patent: Mar. 22, 2011

(54) METHOD AND APPARATUS FOR IMPLIED EDITING ACTION THROUGH DIRECTIONAL AND ORDERED DATA SELECTION

(75) Inventors: David Kingsley Clark, Cedar Park, TX (US); David Salinas, Pflugerville, TX (US); Theodore Jack London Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 11/382,317

(22) Filed: May 9, 2006

(65) Prior Publication Data

US 2007/0266313 A1     Nov. 15, 2007

(51) Int. Cl.
*G06F 17/24* (2006.01)
(52) U.S. Cl. ........ 715/255; 715/212; 715/271; 715/272; 715/769; 715/770
(58) Field of Classification Search .................. 715/255, 715/272, 212, 271, 769, 770
See application file for complete search history.

(56) References Cited

U.S. PATENT DOCUMENTS

| | | | | |
|---|---|---|---|---|
| 5,555,363 | A * | 9/1996 | Tou et al. ........................ | 715/205 |
| 5,796,406 | A * | 8/1998 | Shigematsu et al. .......... | 715/863 |
| 6,185,591 | B1 * | 2/2001 | Baker et al. .................... | 715/210 |
| 6,527,812 | B1 * | 3/2003 | Bradstreet ...................... | 715/210 |
| 6,683,600 | B1 * | 1/2004 | Lui ................................. | 345/179 |
| 6,996,554 | B2 | 2/2006 | Kotsis et al. | |
| 7,123,244 | B2 * | 10/2006 | Lui ................................. | 345/173 |
| 7,461,349 | B1 * | 12/2008 | Sharma et al. ................. | 715/770 |
| 7,496,853 | B2 * | 2/2009 | Awada et al. .................. | 715/767 |
| 2003/0004957 | A1 | 1/2003 | Broman et al. | |
| 2003/0004959 | A1 | 1/2003 | Kotsis et al. | |

FOREIGN PATENT DOCUMENTS

JP         08221412 A  *  8/1996

OTHER PUBLICATIONS

Conditional Operations in a Multiple Data Editor, May 1, 1985, IBM Technical Disclosure Bulletin, May 1985, US, vol. 27, Issue 12, p. 6976.*
Multiple Item On-line Clipboard, Jul. 1, 1992, IBM Technical Disclosure Bulletin, Jul. 1992, US, vol. 35, Issue 2, p. 425.*
Mthod for recursive Multiple Partition Clipboard with Filter Functions, Mar. 1, 1994, IBM Technical Disclosure Bulletin, Mar. 1994, US, vol. 37, Issue 3, p. 247-248.*
Translation of JP 08221412 A, Aug. 1996, Arai et al. JPO Patent Application.*
China Patent Office Action May 22, 2009.

* cited by examiner

*Primary Examiner* — Stephen S Hong
*Assistant Examiner* — I-Chan Yang
(74) *Attorney, Agent, or Firm* — Yee & Associates, P.C.; Justin M. Dillon

(57) ABSTRACT

Provided are a computer implemented method and apparatus for manipulating data through directional or ordered selection of data. A first user input is received for selecting a section of data in a direction of selection, or an order of selection, from a source. A second user input is received for performing a basic editing operation on the selection. Responsive to the second input received from the user, the selected section of data is re-oriented or re-ordered in a direction or order corresponding to the direction or order of selection. A third user input is received for performing a basic editing operation at a destination. The re-oriented or re-ordered section of data is subjected to the second action at the destination. Once the user has selected a section of data, the user can also choose to re-orient or re-order the data in conjunction with a basic editing operation by selecting an enhanced editing operation that implements the inventive method from a menu.

20 Claims, 7 Drawing Sheets

*FIG. 3B*

| | A | B | C |
|---|---|---|---|
| 1 | David Foley | $125.54 | |
| 2 | George Clark | $451.92 | |
| 3 | John Doe | $732.12 | |
| 4 | Michael Brown | $755.73 | |
| 5 | Sharon Eaton | $815.29 | |
| 6 | William Appleby | $985.00 | |
| 7 | | | |

Source file A

*FIG. 3C*

Destination file B

| | A | B | C |
|---|---|---|---|
| 1 | | | |
| 2 | | | |
| 3 | | | |
| 4 | | | |
| 5 | | | |
| 6 | | | |
| 7 | | | |

*FIG. 3D*

Destination file B

| | A | B | C |
|---|---|---|---|
| 1 | William Appleby | $985.00 | |
| 2 | Sharon Eaton | $815.29 | |
| 3 | Michael Brown | $755.73 | |
| 4 | John Doe | $732.12 | |
| 5 | George Clark | $451.92 | |
| 6 | David Foley | $125.54 | |
| 7 | | | |

| File Edit Format View Help | Source file A |—404

The quick brown fox jumped over the hill.

| File Edit Format View Help | Source file A |—404

The quick brown fox jumped over the hill.

| File Edit Format View Help | Destination file B |—442

| File Edit Format View Help | Destination file B |—442 llih eht revo depmuj xof nworb kciuq ehT

Source_file_list

| Name | Size | Type | Date Modified |
|---|---|---|---|
| Animals.gif | 634 KB | GIF Image | 8/21/1997 12:30 AM |
| Awards.gif | 61 KB | GIF Image | 8/21/1997 12:30 AM |
| Education.gif | 102 KB | GIF Image | 8/21/1997 12:30 AM |
| Flags.gif | 217 KB | GIF Image | 8/21/1997 12:30 AM |
| Sports.gif | 27 KB | GIF Image | 8/21/1997 12:30 AM |
| Transportation.gif | 67 KB | GIF Image | 8/21/1997 12:30 AM |
| Weather.gif | 133 KB | GIF Image | 8/21/1997 12:30 AM |

*FIG. 5B*

Source_file_list

| Name | Size | Type | Date Modified |
|---|---|---|---|
| Animals.gif | ③ 634 KB | GIF Image | 8/21/1997 12:30 AM |
| Awards.gif | ② 61 KB | GIF Image | 8/21/1997 12:30 AM |
| Education.gif | ⑥ 102 KB | GIF Image | 8/21/1997 12:30 AM |
| Flags.gif | ⑦ 217 KB | GIF Image | 8/21/1997 12:30 AM |
| Sports.gif | ④ 27 KB | GIF Image | 8/21/1997 12:30 AM |
| Transportation.gif | ① 67 KB | GIF Image | 8/21/1997 12:30 AM |
| Weather.gif | ⑤ 133 KB | GIF Image | 8/21/1997 12:30 AM |

*FIG. 5C*

Destination_file_list

| Name | Size | Type | Date Modified |
|---|---|---|---|

7 objects — 1.20 MB — My Computer

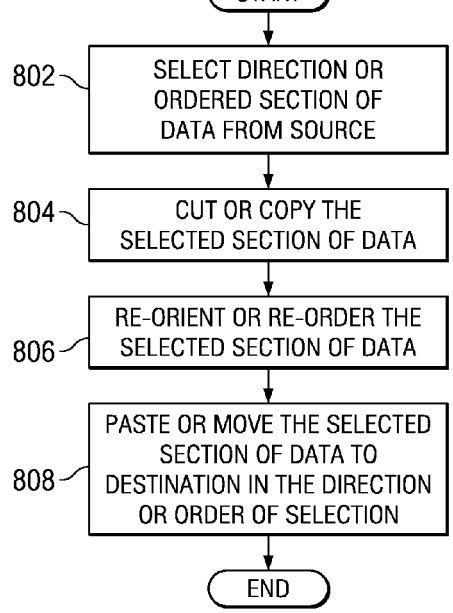
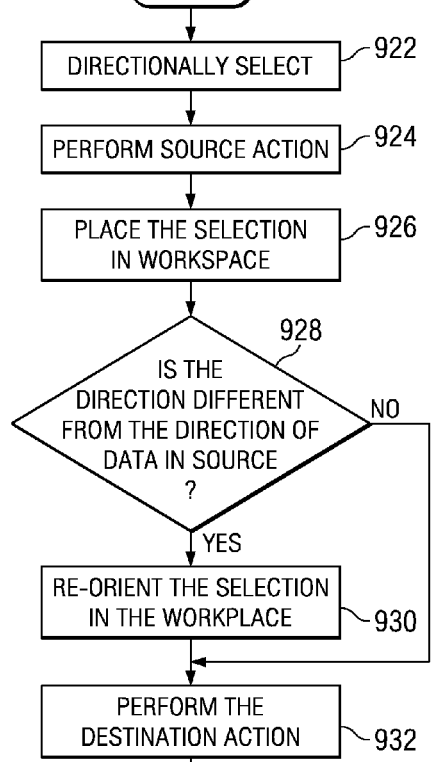
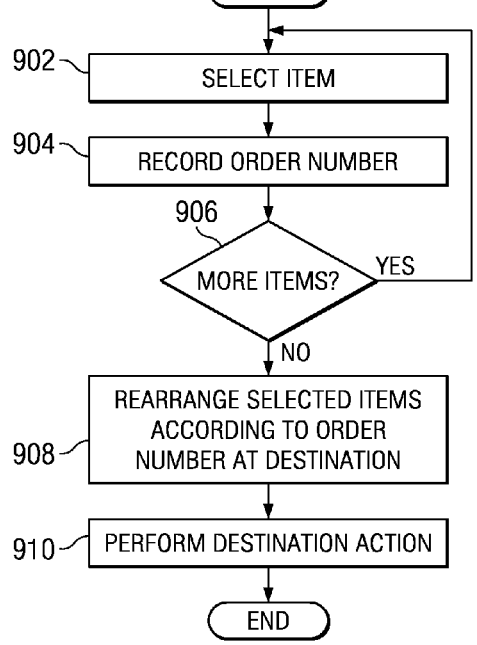
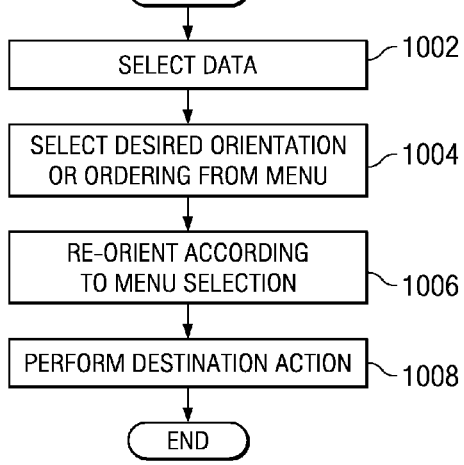

METHOD AND APPARATUS FOR IMPLIED EDITING ACTION THROUGH DIRECTIONAL AND ORDERED DATA SELECTION

BACKGROUND OF THE INVENTION

1. Field of the Invention

The aspects believed novel relate generally to an improved data processing system and in particular to an improved method and apparatus for processing data. Still more particularly, the aspects provide a method and apparatus for re-orienting or re-ordering of data based on directional or ordered selection of data.

2. Description of the Related Art

In data processing systems, some basic activities with respect to data involve moving, organizing, and editing the data. For this purpose, software applications designed to run on these data processing systems provide tools to move, copy, cut, paste, or otherwise edit data. Such tools are known as editing tools, and each data operation such as 'move', 'copy', 'cut', and 'paste' is an editing operation. These editing operations are referred to as basic editing operations, or simply, editing operations. Other specialized editing tools such as 'crop' are available for performing specialized editing operations on specific types of data. Source and destination locations in a data processing system may be files or directories in the data processing system. Further, the destination file may be the same as the source file and the copy may simply be a copy to a different location in the same source file.

Alternatively, an editing operation may be applied from one source file to multiple destination files. For example, a typical copy operation on a text file is undertaken by selecting the text to be copied using a computer mouse or other pointing or selecting device, and selecting the copy operation from a menu. One way in which the copy operation selection, and other selections, can be accessed in many operating system environments is by clicking the right mouse button to display the menu of operation selections, and selecting 'copy' from the displayed menu.

Operations, such as 'copy' and other editing operations are operating system dependent as well as software application dependent, and may be accomplished via a number of alternate ways other than selecting from a menu. Other editing operations may be applied to other types of data, such as, for example, text files, spreadsheets, graphics, image files, and lists.

Currently, the basic editing operations are limited to the actual operation. The actual operation does not involve transformation of the data that is the subject of the editing operation. For example, a copy operation simply copies, regardless of the data being copied, or the intention of the person performing the copy operation. Frequently, the user performing a basic editing operation intends more than the bare editing operation. Such intentions are manifested in the manner in which the steps of the editing operation are performed, and actions subsequent or prior to performing the editing operation.

Therefore, it would be advantageous to have an improved method, apparatus, and computer instructions for performing additional implicit actions together with basic editing operations, specifically, re-orientation or re-ordering of data based on directional or ordered selection of data for the editing operation.

SUMMARY OF THE INVENTION

Provided are a computer implemented method and apparatus for manipulating data through directional or ordered selection of data. A first user input is received for selecting a section of data in a direction of selection, or an order of selection, from a source. A second user input is received for performing a basic editing operation on the selection. Responsive to the second input received from the user, the selected section of data is re-oriented or re-ordered in a direction or order corresponding to the direction or order of selection. A third user input is received for performing a basic editing operation at a destination. The re-oriented or re-ordered section of data is subjected to the second action at the destination.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustration of one implementation of aspects of the process in accordance with an illustrative embodiment;

FIGS. 3A-3D are illustrations of copy operation from a source spreadsheet to a destination spreadsheet in accordance with an illustrative embodiment;

FIGS. 4A-4D are illustrations of copy operation from a source text file to a destination text file in accordance with an illustrative embodiment;

FIGS. 5A-5D are illustrations of copy operation from a listing of files in a source directory to a listing of files in a destination directory, in accordance with an illustrative embodiment;

FIG. 8 is a flowchart showing the summarized steps of cut, copy, paste, and move editing operations, in accordance with an illustrative embodiment;

FIG. 9A is a flowchart showing detailed steps of the process illustrated in FIG. 8;

FIG. 9B is a flowchart showing the re-ordering of data in conjunction with editing operations, in accordance with an illustrative embodiment; and FIG. 10 is a flowchart showing selecting the desired re-orienting or re-ordering action from a menu in conjunction with editing operations, in accordance with an illustrative embodiment.

DETAILED DESCRIPTION OF THE PREFERRED EMBODIMENT

Figure 1:
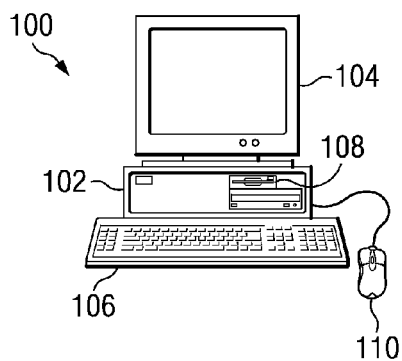
FIG. 1 is a pictorial representation of a data processing system in which the aspects of the process may be implemented.

Frequently, a user performing an editing operation intends more than the bare editing operation. Such intentions are manifested in the manner in which the steps of an editing operation are performed, and actions subsequent or prior to performing the editing operation. For example, a user editing a source spreadsheet may select a section of data from bottom-row going up to the top-row of the source spreadsheet, and then execute the copy operation. When the user executes the paste operation on a destination spreadsheet, the section of data pasted on the destination spreadsheet is oriented the same way—top-to-bottom—as was the orientation in the source spreadsheet, regardless of the user's selection in the bottom-to-top direction. The user then has to take several additional steps to re-orient the data in the bottom-to-top orientation on the destination spreadsheet.

Similarly, a user may want to move list data while simultaneously re-ordering the data at the destination. Currently, a move operation preserves the ordering of the source in the destination. For example, a user working with a table of several rows of data may select several non-contiguous rows to move them to a new blank table. The user may select the rows in any desired non-sequential order. The aspects of the process recognize that currently, regardless of the order in which the user selected the rows, the destination table will contain the rows in the same order in which the rows were in the source table.

Currently, the user must undertake several subsequent steps and editing operations on the destination table to re-organize the rows in the order in which the user had initially selected them from the source. These scenarios using copy and move operations on spreadsheets and tables respectively are used only as examples of editing operations and data files. Such use is not intended to limit the illustrative embodiments to just copy, cut, paste, or move operation on spreadsheets and tables. Such use is further not intended to limit the illustrative embodiments to just top-to-bottom or bottom-to-top orientations of the selected sections of data.

Aspects of the process recognize that basic editing operations currently impose limitations similar to those described here when operating on various file types and organizations of data. Various editing operations can employ the aspects in vertical, lateral, and diagonal directions in the manner described here, on a variety of file types and organizations of data.

Undoubtedly, currently available basic editing tools require numerous steps and repeated actions by the user to accomplish the re-orientation, re-ordering, and other transformations of data that are implicit in the manner in which the user undertakes the editing operation. Implicit task is a task that is suggested by the manner, sequence, style, direction, order or other similar attributes of the user's express action. For example, when a user selects a section of data in a certain direction in order to 'cut' and 'paste', the user wants the cut section of data re-oriented in the direction of selection. In this case, an implicit task is the re-orientation of the section of data between 'cut' and 'paste' editing operations implied from the direction of selection prior to the 'cut' operation. Aspects of the process provide a method, and apparatus, for performing implicit tasks of re-orienting, re-ordering, or transforming sections of data selected for editing operations.

With reference now to the figures and in particular with reference to FIG. 1, a pictorial representation of a data processing system is shown in which the aspects of the process may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM© eServer™ computer or IntelliStation® computer, which are products of International Business Machines Corporation, located in Armonk, N.Y. Although the depicted representation shows a personal computer, other embodiments may be implemented in other types of data processing systems, such as a network computer. Computer 100 also preferably includes a graphical user interface (GUI) that may be implemented by means of systems software residing in computer readable media in operation within computer 100.

Figure 2:
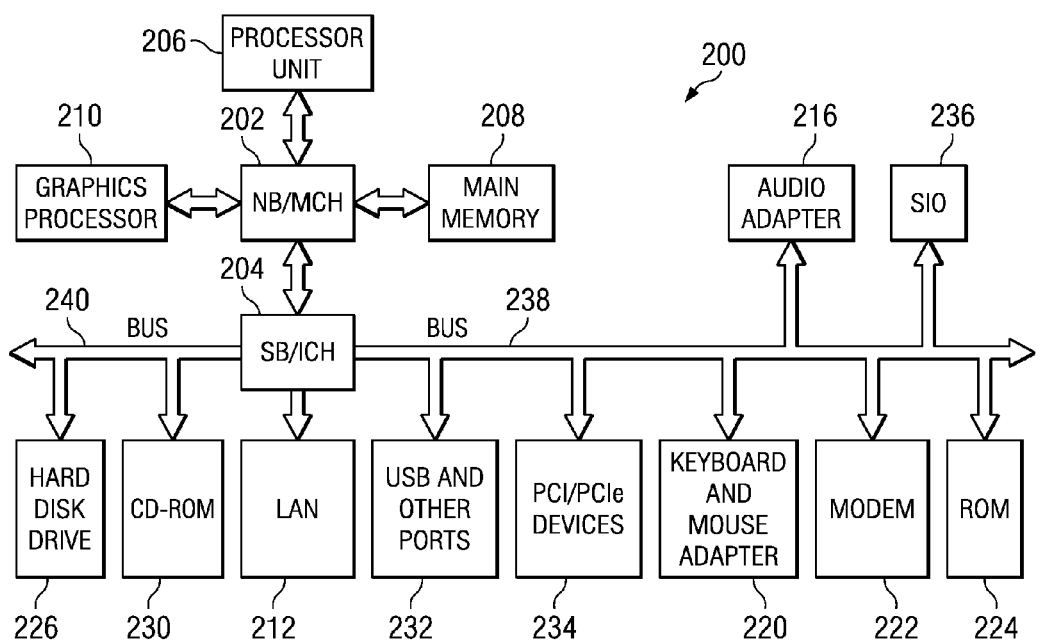
FIG. 2 is a block diagram of a data processing system in which aspects of the process may be implemented.

With reference now to FIG. 2, a block diagram of a data processing system is shown in which aspects of the process may be implemented. Data processing system 200 is an example of a computer, such as computer 100 in FIG. 1, in which code or instructions implementing the processes may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the methods provide for computer implemented methods, apparatus, and computer usable program code for compiling source code. The methods may be performed in a data processing system, such as data processing system 100 shown in FIG. 1 or data processing system 200 shown in FIG. 2.

Figures 3, 3A:
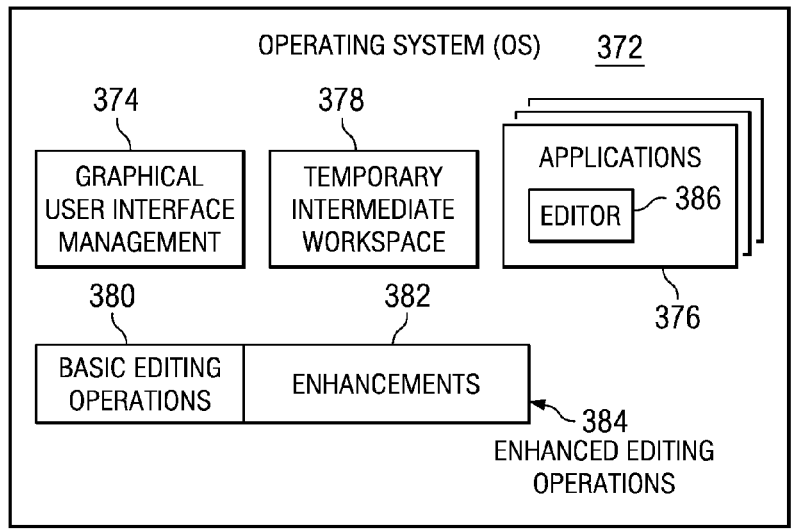

FIG. 3 is a block diagram illustration of components used to provide editing operations in accordance with an illustrative embodiment. These software components may be executed in a data processing system such as data processing system 200 in FIG. 2. The software components are shown to be loaded and operating within operating system (OS) 372. Generally, only certain components of an operating system are loaded in the main memory, such as 208, as required at any given time. Not all components of operating system 372 are necessarily resident in the main memory 208. Operating system 372 has a component 374 that manages the displaying, manipulation and control of graphical user interface 252 as seen by a user. Other software applications 376, such as a spreadsheet application, may be loaded by the operating system as needed.

Operating system 372 supports basic editing operations 380 that are capable of working with other components and applications 376 that may be loaded by the OS 372. Typically, an application 376 has an editor 386 built into the application that presents the editing operations 380 to a user for use within the application. The enhanced editing operations 384 are contemplated to be similarly presented through editor 386. Aspects may be implemented in the form of enhancements 382 that are also loaded by the OS 372. The basic editing operations together with the enhancements are called enhanced editing operations 384.

Typically, basic editing operations utilize some temporary intermediate workspace 378 in order to perform the editing operations. Clipboard in Windows® operating system is an example of the temporary intermediate workspace 378. Enhancements 382 also utilize the temporary intermediate workspace 378. The various components of the block diagram FIG. 3 may be located in different parts of the data processing system 200 depending on implementation details of various operating systems, data processing system configurations, and requirements of various software applications. FIG. 3 provides only an exemplary illustration of one way in which aspects of the method may be implemented and is not intended to be limiting.

With reference to FIGS. 3A-3D, a progression of spreadsheets is depicted as a process for editing data is applied to them in conjunction with editing operations in accordance with an illustrative embodiment. The different operations are examples of editing operations that may be accomplished by a user using applications 376 loaded in operating system 372 in FIG. 3.

Turning now to FIG. 3A, a spreadsheet containing rows of data is shown on which the process can be applied in conjunction with basic editing operations, in accordance with an illustrative embodiment. FIG. 3A is only an illustrative example used for showing aspects of the process, and is not intended to limit the process to spreadsheets.

In these illustrative examples, spreadsheet 300 is a source spreadsheet as indicated by the label 304, shown to contain rows of names 302 that a user intends to re-orient while copying to a destination file.

Continuing with the spreadsheet 300 of FIG. 3A, FIG. 3B shows the next progression in the process in conjunction with editing operation as applies to spreadsheet 300, in accordance with an illustrative embodiment. User input has been received to select rows 302 by selecting the bottom row in 302 and sweeping the selecting device upwards to the top row in 302. The overlaid arrow 324 indicates the direction of selection of the section of the data. A computer mouse, such as 110 in FIG. 1, is the most commonly used selecting device for performing editing operations, but other pointing devices or selecting devices that are capable of directional motion may be used without affecting the process described here.

The selected section of data is subjected to copy or cut editing operation. This operation results in the selected section of data being re-oriented in bottom-up orientation in temporary intermediate workspace 378 in FIG. 3. Basic editing operations that may occur include, for example, copy, cut, paste, and move, and may vary depending on the operating system on which the software application providing the editing operations is designed to run. Typically, editing operations utilize some temporary intermediate workspace, such as 378 in FIG. 3, for editing the selected section of data during transition between source and destination files. Such temporary intermediate workspace 378, although shown as a part of main memory 208 in FIG. 2, can be a part of data processing system's main memory, or a separate designated memory, or space on the hard disk. Regardless of the manner of implementation of the temporary intermediate workspace, any processing of the selected section of data can take place in these illustrative examples while the selected section of data is temporarily stored in this temporary intermediate workspace. Software implementation of the process can perform the re-orientation while the selected section of data is resident in the temporary intermediate workspace.

Turning now to FIG. 3C, a blank spreadsheet 340 is shown in accordance with an illustrative embodiment. Spreadsheet 340 is the destination spreadsheet as indicated by the label "destination file B" 342, for the re-oriented selected rows 302 from FIG. 3B. Continuing with the spreadsheet 340 of FIG. 3C, FIG. 3D shows the next progression in the process in conjunction with basic editing operation as applies to spreadsheet 340. User input has been received to execute the 'paste' editing operation to selected rows 302 onto spreadsheet 340. Selected rows 302 are shown as being re-oriented in the bottom-to-top orientation 362 by the application of the aspects of the process.

An advantage of the processes from the above description is worth noting. As contrasted with the processes, using only basic editing operations, a user would have to execute several steps involving several basic editing operations, in a repetitive manner to accomplish the re-orientation of selected section of data. Using the processes, the user does not need to execute several editing operations, or repetitive steps to accomplish the re-orientation of the selected section of data. The processes accomplish the re-orientation as an implicit action resulting from the direction 324 of selection of rows 302.

With reference to FIGS. 4A-4D, a progression of text files is depicted as processes are applied to the text files in conjunction with basic editing operations, in accordance with an illustrative embodiment. The different operations are examples of editing operations that may be accomplished by a user using applications 256 loaded in operating system 372 in FIG. 3.

Turning now to FIG. 4A, a text file containing a line of text is shown on which the process can be applied in conjunction with basic editing operations, in accordance with an illustrative embodiment. FIG. 4A is only an illustrative example used for showing the aspects of the process, and is not intended to limit the process to text files.

Text file 400 is a source file as indicated by the label 404, shown to contain a line of text 402 that a user intends to re-orient while copying to a destination file.

Continuing with the text file 400 of FIG. 4A, FIG. 4B shows the next progression in the process in conjunction with basic editing operation as applies to text file 400, in accordance with an illustrative embodiment. User input has been received to select line of text 402 by selecting the right end of the line of text 402 and sweeping the selecting device right-to-left over the line of text 402, as indicated by the overlaid arrow 424 indicating the direction of selection of the section of the data. Again, a computer mouse, or other pointing or selecting devices that are capable of directional motion may be used for selecting sections of data in these illustrative embodiments.

The section of data thus selected is subjected to 'copy' or 'cut' basic editing operation. The section of data is re-oriented in right-to-left orientation in memory, such as Main Memory 208 in FIG. 2, or, more precisely, in temporary intermediate space 378 in FIG. 3. Aspects of the process can perform the re-orienting while the selected section of data is in the temporary intermediate workspace as described above.

Turning now to FIG. 4C, a blank text file 440 is shown in accordance with an illustrative embodiment. Text file 440 is the destination text file as indicated by the label "destination file B" 442, for the re-oriented selected line of text 402 from FIG. 4B. Continuing with the spreadsheet 440 of FIG. 4C, FIG. 4D shows the next progression in the process in conjunction with editing operation as applies to text file 440, in accordance with an illustrative embodiment. User input has been received to execute 'paste' editing operation to selected line of text 402 onto text file 440. Selected line of text 402 is shown to have been re-oriented in the right-to-left orientation 462 by the application of aspects.

An advantage of the process is worth noting. As contrasted with the process, using only basic editing operations, a user would have to execute several steps involving several basic editing operations, in a repetitive manner to accomplish the re-orientation of selected section of data. Using the process, the user need not execute several editing operations, or repetitive steps to accomplish the re-orientation of the selected section of data. The process accomplishes the re-orientation as an implicit action resulting from the direction 424 of selection of line of text 402.

While re-orienting text from right-to-left may not result in meaningful text as shown in this exemplary illustration, transposing certain forms of data from one direction to another is useful in a variety of data processing activities. For example, an image may be transposed right-to-left to yield a mirror image of the original image, which may have meaningful applications. Present example uses plain text in order to illustrate the effects of the process.

With reference to FIGS. 5A-5D, a progression of lists is depicted as the process is applied to the lists in conjunction with basic editing operations, in accordance with an illustrative embodiment. The different operations are examples of editing operations that may be accomplished by a user using applications 376 loaded in operating system 372 in FIG. 3.

Turning now to FIG. 5A, a list containing several files is shown on which aspects of the process can be applied in conjunction with editing operations, in accordance with an illustrative embodiment. FIG. 5A is only an illustrative example used for showing the steps of the process, and is not intended to limit the process to list of files.

List 500 is a source list as indicated by the label 504, shown to contain several files 502 that a user intends to re-order while copying to a destination list.

Continuing with the list 500 of FIG. 5A, FIG. 5B shows the next progression in the process in conjunction with basic editing operation as applies to list 500, in accordance with an illustrative embodiment. User input has been received to select files 502 by selecting one file at a time. The order of selection is depicted by the overlaid circled numerals 524. The filename with circled numeral 1 is selected first; the filename with circled numeral 2 is selected next, and so on. The section of data thus selected is subjected to 'copy' or 'cut' basic editing operation. The section of data is re-ordered in the order of selection in memory, such as Main Memory 208 in FIG. 2, or more precisely, in temporary intermediate space 378 of FIG. 3, while the selected section of data is in the temporary intermediate workspace as described above.

Figure 5D:
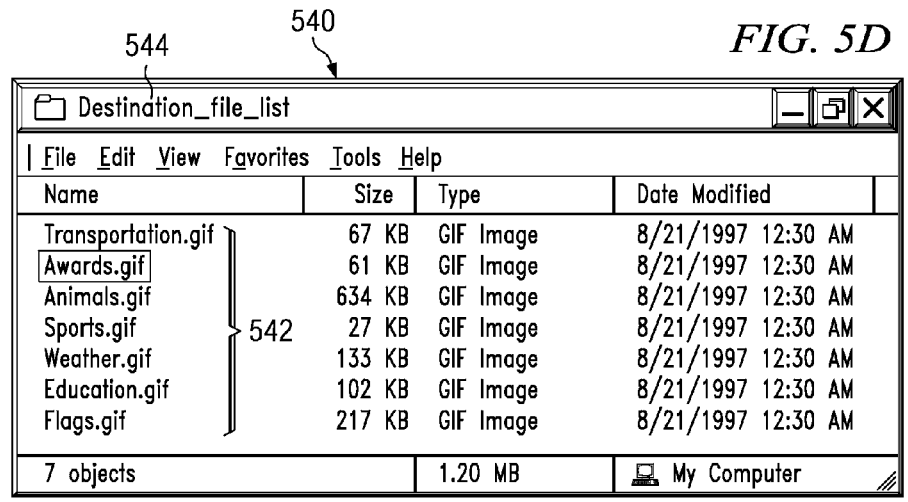

Turning now to FIG. 5C, a blank list 540 is shown in accordance with an illustrative embodiment. List 540 is the destination list as indicated by the label "destination_file_list" 544, for the re-ordered selected files 502 from FIG. 5B. Continuing with the list 540 of FIG. 5C, FIG. 5D shows the next progression in the process in conjunction with basic editing operation as applies to list 540. User input is received to execute 'paste' editing operation to selected files 502 onto list 540. Selected files 502 are shown to have been re-ordered 542 in the order of selection 524 by the application of aspects.

An advantage of the process is worth noting. As contrasted with the process, using only basic editing operations, a user would have to execute several steps involving several basic editing operations, in a repetitive manner to accomplish the re-ordering of selected section of data. Using the process, the user does not need to execute several editing operations, or repetitive steps to accomplish the re-ordering of the selected section of data. The process accomplishes the re-ordering as an implicit action resulting from the order of selection 524 of selection files 502.

Re-orientation, re-ordering, and transformation of data generally is dependent on the nature of the data. Some types of data yield meaningful results when transformed in certain ways, and meaningless results when transformed in other ways. For example, an image data is meaningful when transposed right-to-left, but a text in English language is generally not. Similarly, re-ordering a selection of single item selection is often meaningless, but re-ordering a selection of multiple items is meaningful. Therefore, a number of tests can be incorporated in the process to make the process more meaningful to the software application with which the process may be associated.

Figure 6:
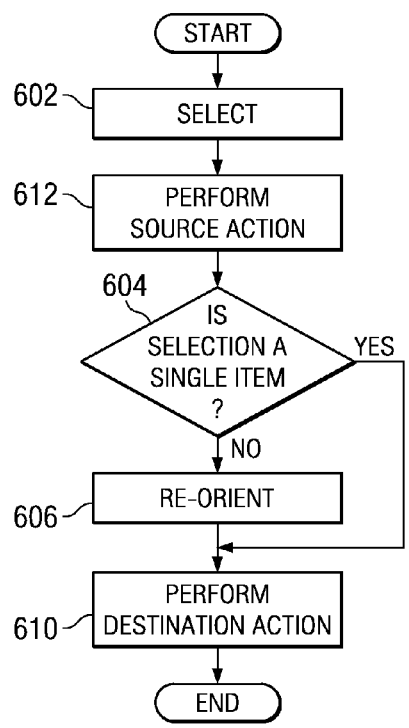
FIG. 6 is a flowchart showing the steps of one test—whether the selected section of data includes only one item—that can be included in the process, in accordance with an illustrative embodiment.

With reference now to FIG. 6, a flowchart of a process for a test is depicted in accordance with an illustrative embodiment. The process illustrated in FIG. 6 may be implemented in a component, such as enhancements 382 in FIG. 3.

The process begins with a section of data being selected from a source in an application such as 376 (step 602). A basic editing operation such as 260 is executed (step 612). The process then determines if the selected section of data contains a single item (step 604). This determination can be made by simply counting the number of items in selected section of data in accordance with an illustrative embodiment. If the selected section of data contains more than one item (NO branch of step 604), the process proceeds to re-orient the selected section of data in temporary intermediate space such as 378 (step 606). Following the re-orientation of the selected section of data (step 606), the process proceeds to performing a selected basic editing operation such as 380 at the destination (step 610). If, however, the selected section of data contains a single item (YES branch of step 604), the process proceeds to performing the selected basic editing operation such as 380 at the destination (step 610).

Figure 7:
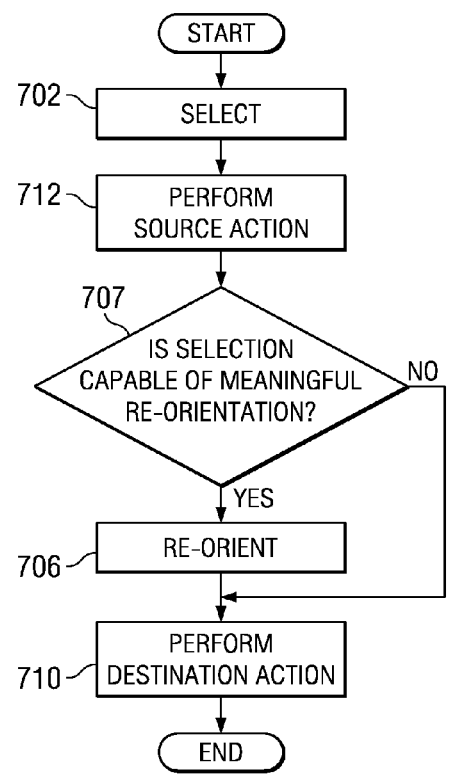
FIG. 7 is a flowchart showing the steps of a second test—whether the selected section of data is capable of meaningful re-orientation or re-ordering—that can be included in the process, in accordance with an illustrative embodiment.

With reference now to FIG. 7, a flowchart is shown, illustrating a process for a different test in accordance with an illustrative embodiment. The process illustrated in FIG. 7 may be implemented in a component, such as enhancements 382 in FIG. 3. Tests shown in FIGS. 6 and 7 may be combined in a component, such as enhancements 382.

The process begins with a section of data being selected from a source in an application such as 376 (Step 702). A basic editing operation such as 380 is executed (Step 712). The process then determines if the selected section of data is capable of meaningful re-orientation (Step 704). One way in which this determination can be made is by looking up a table containing various data types with corresponding flags indicating whether re-orientation of that data type is meaningful. The illustrative examples use the lookup table method, which is described here only as an exemplary method for making this determination, and is not intended to be limiting on the process. Other ways for making this determination are possible. For example, the determination may also be made by matching a checksum or hash value of re-oriented data to acceptable checksum or hash values.

If the process determines that the selected section of data is capable of meaningful re-orientation (YES branch of step 707), the process proceeds to re-orient the selected section of data (step 706). Following the re-orientation of the selected section of data (step 706), the process proceeds to performing the basic editing operation at the destination (step 710). If, however, the selected section of data is not capable of meaningful re-orientation (NO branch of step 704), the process proceeds to performing the basic editing operation at the destination (step 710).

FIG. 8 is a flowchart showing summarized aspects for 'cut', 'copy', 'paste', and 'move' basic editing operations in accordance with an illustrative embodiment. The process depicted in FIG. 8 may be implemented in a component, such as enhancements 382 in FIG. 3. The process begins with receiving a user input for a directional or ordered selection of section of data from a source in application such as 376 (step 802). Next, the process receives a user input for executing an editing operation 380, such as cut or copy, on the selected section of data (step 804). The process then re-orients or re-orders the data in temporary intermediate workspace 378, depending upon whether the selection was directional or ordered (step 806). Next, the process receives a user input to execute an editing operation 380, such as move or paste, at the destination (step 808). Having placed the re-oriented or re-ordered section of data at the destination, the process ends. For clarity and conciseness, the term "choice of selection" is used to mean either a direction of selection, or an order of selection, and the term "chosen selection" is used to mean either a selection made directionally, or a selection made in a particular order.

FIG. 9A is a flowchart showing detailed aspects of the process illustrated in FIG. 8 in accordance with an illustrative embodiment. FIG. 9A shows an implementation of the illustrative embodiment for re-orienting data in conjunction with basic editing operations. The process illustrated in FIG. 7 may be implemented in a component, such as enhancements 382 in FIG. 3.

The process proceeds by receiving a user input for selecting a section of data from a source in an application 376 (step 922). Step 922 is similar to step 802 in FIG. 8. Next, the process receives another user input to execute a basic editing operation 380 (Step 924) similar to step 804 in FIG. 8. The process then places the selected section of data in a temporary intermediate workspace 378 (step 926). Next, the process determines if the direction or order of selection is different from the direction or order of selected items in the source (Step 928). The process may determine that the direction or the order of the selected section of data is the same as in the source (NO branch of step 928). If this is the case, the process does not re-orient or re-order the selected section of data in temporary intermediate workspace, and proceeds to the next step where the user executes a basic editing operation at the destination (step 932). If, however, the process determines that the direction or the order of the selected section of data is different from the source (YES branch of step 928), the process re-orients or re-orders the selected section of data in temporary intermediate workspace (step 930). The process then receives another user input for executing a basic editing operation at the destination (step 932).

Re-orienting, ordering, sorting, and transforming data while in temporary intermediate workspace is commonly utilized for a variety of other text editing actions. The invention lies, not in the re-orienting or re-ordering technology, but in capturing the directional or ordering attributes of a selection while a user makes the selection, and using such attributes to perform implicit actions of re-orienting and re-ordering while the selected section of data resides in temporary intermediate workspace.

FIG. 9B is a flowchart showing detailed aspects illustrated in FIG. 8 in accordance with an illustrative embodiment. FIG. 9B shows an alternate implementation for re-ordering data in conjunction with basic editing operations. The process illustrated in FIG. 7 may be implemented in a component, such as enhancements 382 in FIG. 3.

When the process receives user input for selecting a number of distinct items in a certain order, the ordering of the selection becomes important for performing the re-ordering. The process begins when a user input is received for selecting an item from a source in application 376 (Step 902). The process records the order number of the selection (step 904), incrementing the order number for each subsequent selection input received from user, prior to executing an editing operation 380. The recording of order numbers can be done in memory such as main memory 208 in FIG. 2, or in other designated memory or storage space. The process repeats steps 902-904 as long as the user inputs are received making more selections (YES branch of step 906). The process determines whether all the selections have been made, forming a selected section of data (NO branch of step 906). When the process has made all selections, the process proceeds to re-order the selected section of data according to the recorded selection order (step 908). One way to determine whether all user inputs for selecting data have been received is to detect a user input for executing a basic editing operation 380 following the inputs for selection. However, this method of determination is not intended to be limiting but only intended to show an exemplary method for making the determination in accordance with an illustrative embodiment. Other methods for making this determination are possible, such as, detecting a user input expressly signaling the end of selection.

The re-ordering of selected section of data (step 908) essentially follows the description of step 806 in FIG. 8 that has been elaborated in the detailed description of FIG. 9A. The process terminates with the execution of an editing operation 380 at the destination (step 910).

FIG. 10 is a flowchart showing a process for selecting desired re-orienting or re-ordering action from a menu in conjunction with basic editing operations, in accordance with an illustrative embodiment. The process illustrated in FIG. 10 may be implemented in a component, such as enhancements 382 in FIG. 3.

The process as illustrated in FIGS. 8, 9A, and 9B illustrate re-orienting or re-ordering based on the directional or ordering attributes of the selection input from the user. The flowchart in FIG. 10 shows that the process can also be implemented in a menu driven manner in accordance with another illustrative embodiment. Basic editing operations such as copy, cut, paste, or move are usually presented to the user via a menu or a shortcut to a menu of available operations, or a shortcut to an operation itself, in the software application. The user selects a section of data, and then a basic editing operation from the menu to apply to the selected section of data.

The aspects can be encapsulated in the form of an enhanced editing operation 384. Such enhanced editing operations can then be made available on a menu or a shortcut to a menu of available operations, or in the form of a shortcut to the enhanced editing operation. The enhanced editing operations 384 are the commonly provided editing operation in conjunction with the process as shown in FIG. 3. Some examples of such enhanced editing operations are—if the basic editing operation is 'copy', the enhanced editing operation would be 'copy right-to-left', or 'Copy bottom-to-top', or 'Copy in the order selected'. Other basic editing operations can similarly be presented as enhanced editing operations in accordance with this illustrative process. This method of 'explicit' action on the selected section of data is an alternate way of making the process available to the user. An explicit action is an action taken in response to an express input from the user. An explicit action is not deduced from other actions of the user. In the explicit action method, the process relies on user's explicit selection of enhanced editing operation rather than the implicit direction or order of selected section of data. Similar to the implicit task method, the explicit action method also eliminates the need for multiple or repetitive operations in order to re-orient or re-order the selected section of data at the destination.

Here, the process begins by receiving a user input for selecting section of data either directionally or in some order from a source in application 376 (step 1002). Next, instead of receiving a user input of a basic editing operation selection from a menu, the process receives a user input selecting an enhanced editing operation 384 from the menu (step 1004). The selected menu option represents the basic editing operation in conjunction with the desired aspect (step 1004). Next, the process performs the re-orientation or re-ordering depending on the enhanced editing operation selected by the user (step 1006). The process terminates with the execution of an editing operation 380 at the destination (step 1008).

In this manner, the aspects of the process provide a computer implemented method, apparatus, and computer usable program code for implied editing action through directional and ordered data selection. A first input for selecting data from a source is received. The input for selecting data has directional or ordering attributes. A second input for performing an editing operation at the source is received. The directional or ordering attributes are combined with the editing operation at the source. Re-orientation or re-ordering of selected data is performed if certain tests and conditions for doing so are satisfied. A third user input for performing an editing operation at a destination is received. The re-oriented or re-ordered selection is subjected to the editing operation at the destination.

As contrasted with the process, using only basic editing operations, a user would have to execute several steps involving several basic editing operations, in a repetitive manner to accomplish the re-orienting or re-ordering of selected section of data. Using the process, the user does not need to execute several editing operations, or perform repetitive steps to accomplish the re-orienting or re-ordering of the selected section of data. The process accomplishes the re-orienting or re-ordering as an implicit action resulting from the direction or order of selection from the source.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be (1) a computer-readable storage medium including an electronic, magnetic, optical, electro-magnetic, infrared, or semiconductor system (or apparatus or device) or (2) a propagation medium. Examples of a computer-readable storage medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiment is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for manipulating a section of data comprising a plurality of data elements, the computer implemented method comprising steps performed by a computer of:
    receiving, by the computer, a first user input for selecting the section of data comprising the plurality of data elements from a source in a direction of selection, wherein the selecting of the section of data comprises selecting a designated data element from the plurality of data elements and then sweeping a selecting device in a certain positional direction to include more of the plurality of elements;
    responsive to receiving the first user input by the computer, selecting the section of data comprising the plurality of data elements from the source in the direction of selection, to form a selected section of data;
    receiving, by the computer, a second user input to manipulate the selected section of data;
    responsive to receiving the second user input to manipulate the selected section of data by the computer, determining whether to perform a manipulation on the selected section of data using a look-up table containing various data types with corresponding flags indicating whether to re-orient a given data type of the various data types and if the manipulation is so determined to be performed, performing the manipulation on the selected section of data using the direction of selection to form a modified section of data;
    receiving, by the computer, a third user input to manipulate the selected section of data at a destination;
    responsive to receiving the third user input by the computer, performing a manipulation on the modified section of data at the destination;
    wherein the direction of selection designates a sequential orientation for the selected section of data such that the modified section of data is re-oriented based on a direction of the direction of selection.

2. The computer implemented method of claim 1, wherein the second user input is one of Copy, Cut or Move; and wherein the third user input is one of Paste or Move.

3. The computer implemented method of claim 1, wherein the second user input is received as a selection from a menu, and the second user input comprises a basic editing operation and an action using the direction of selection.

4. The computer implemented method of claim 1, further comprising:
    determining a number of items in the selected section of data, wherein the manipulation on the selected section of data using the direction of selection is only performed when the selected section of data comprises more than one item.

5. The computer implemented method of claim 1, wherein the selected section of data comprises an image and the modified section of data is a mirror image of the image.

6. A computer implemented method for manipulating a section of data comprising a plurality of data elements, the computer implemented method comprising:
    responsive to receiving a first user input selecting the section of data comprising the plurality of data elements from a source having a direction of selection, identifying the direction of selection in which the section of data comprising the plurality of data elements has been selected by the first user input to form a selected section of data, wherein the selecting of the section of data comprises selecting a designated data element from the plurality of data elements and then sweeping a selecting device in a certain positional direction to include more of the plurality of elements; and
    responsive to receiving a second user input to manipulate the selected section of data at a destination, determining whether to perform a manipulation on the selected section of data using a look-up table containing various data types with corresponding flags indicating whether to re-orient a given data type of the various data types and if the manipulation is so determined to be performed, performing the manipulation on the selected section of data at the destination using the direction of selection in which the section of data has been selected, wherein the direction of selection designates a sequential orientation for the selected section of data at the destination such that the selected section of data at the destination is re-oriented.

7. The computer implemented method of claim 6 wherein the performing step comprises:
    inserting the section of data in a manner determined by the direction of selection of the section of data.

8. The computer implemented method of claim 6, wherein the manipulation is selected from one of Copy, Cut, Paste, and Move.

9. The computer implemented method of claim 6, wherein the second user input indicates that the direction of selection in which the section of data has been selected is to be used in manipulating the selected section of data.

10. The computer implemented method of claim 6, wherein the second user input is received as a selection from a menu.

11. The computer implemented method of claim 6, further comprising:
    determining a number of items in the selected section of data, wherein the manipulation on the selected section of data using the direction of selection is performed when the selected section of data comprises more than one item.

12. The computer implemented method of claim 6, wherein the selected section of data comprises an image and wherein the modified section of data is a mirror image of the image.

13. A computer program product comprising a computer readable storage medium including computer usable code for manipulating a section of data comprising a plurality of data elements, the computer program product comprising:
    computer usable code for receiving a first user input for selecting the section of data comprising the plurality of data elements from a source in a direction of selection, wherein the selecting of the section of data comprises selecting a designated data element from the plurality of data elements and then sweeping a selecting device in a certain positional direction to include more of the plurality of elements;

responsive to receiving the first user input, computer usable code for selecting the section of data comprising the plurality of data elements from the source in the direction of selection, to form a selected section of data;

computer usable code for receiving a second user input to manipulate the selected section of data;

responsive to receiving the second user input to manipulate the selected section of data, computer usable code for determining whether to perform a manipulation on the selected section of data using a look-up table containing various data types with corresponding flags indicating whether to re-orient a given data type of the various data types and if the manipulation is so determined to be performed, computer usable code for performing the manipulation on the selected section of data using the direction of selection to form a modified section of data;

computer usable code for performing a manipulation on the selected section of data using the of direction selection to form a modified section of data;

computer usable code for receiving a third user input to manipulate the selected section of data at a destination;

responsive to receiving the third user input, computer usable code for performing a manipulation on the modified section of data at the destination;

wherein the direction of selection designates a sequential orientation for the selected section of data such that the modified section of data is re-oriented based on a direction of the direction of selection.

14. The computer program product of claim 13, wherein the second user input is one of Copy, Cut or Move; and wherein the third user input is one of Paste or Move.

15. The computer program product of claim 13, wherein the second user input is received as a selection from a menu, and the second user input comprises a basic editing operation and an action using the direction of selection.

16. The computer program product of claim 13, wherein the selected section of data comprises an image and the modified section of data is a minor image of the image.

17. A system for manipulating a section of data comprising a plurality of data elements, the system comprising:

a data processor coupled to a memory and operable for executing instructions in the memory;

a first editor in a source application, wherein the first editor receives a first user input for selecting the section of data comprising the plurality of data elements from a source in a direction of selection;

responsive to receiving the first user input, the first editor selects the section of data comprising the plurality of data elements from the source in the direction of selection, to form a selected section of data, wherein the selecting of the section of data comprises selecting a designated data element from the plurality of data elements and then sweeping a selecting device in a certain positional direction to include more of the plurality of elements;

the first editor receives a second user input to manipulate the selected section of data;

responsive to receiving the second user input to manipulate the selected section of data, the first editor determines whether to perform a manipulation on the selected section of data using a look-up table containing various data types with corresponding flags indicating whether to re-orient a given data type of the various data types and if the manipulation is so determined to be performed, the first editor performs the manipulation on the selected section of data using the direction of selection to form a modified section of data;

a second editor in a destination application receives a third user input to manipulate the selected section of data at a destination;

responsive to receiving the third user input, the second editor performs a manipulation on the modified section of data at the destination;

wherein the direction of selection designates a sequential orientation for the selected section of data such that the modified section of data is re-oriented based on a direction of the direction of selection.

18. The system of claim 17, wherein the second user input is one of Copy, Cut or Move; and wherein the third user input is one of Paste or Move.

19. The system of claim 17, wherein the second user input is received as a selection from a menu, and the second user input comprises a basic editing operation and an action using the direction of selection.

20. The system of claim 17, wherein the selected section of data comprises an image and the modified section of data is a mirror image of the image.

* * * * *